July 28, 1925.

J. ROUPP 1,547,610

CORN HARVESTER

Filed Sept. 10, 1923

Inventor

John Roupp

By

Lacey & Lacey, Attorneys

July 28, 1925.

1,547,610

J. ROUPP

CORN HARVESTER

Filed Sept. 10, 1923  7 Sheets-Sheet 3

Fig. 3.

Inventor

John Roupp

By Lacey Ramy Attorneys

July 28, 1925.

J. ROUPP 1,547,610

CORN HARVESTER

Filed Sept. 10, 1923 7 Sheets-Sheet 4

Inventor

John Roupp

By Lacey&Lacey, Attorneys

Patented July 28, 1925.

1,547,610

UNITED STATES PATENT OFFICE.

JOHN ROUPP, OF HESSTON, KANSAS.

CORN HARVESTER.

Application filed September 10, 1923. Serial No. 661,847.

*To all whom it may concern:*

Be it known that I, JOHN ROUPP, a citizen of the United States, residing at Hesston, in the county of Harvey and State of Kansas, have invented certain new and useful Improvements in Corn Harvesters, of which the following is a specification.

My invention relates to harvesting machinery and is intended more particularly for topping corn and similar crops. One object of the invention is to provide a machine which may be readily drawn over a field to act upon the crop and cut the heads from the stalks of corn, wheat or other plants. Another object of the invention is to provide a machine in which the cutting apparatus may be easily adjusted to work at a desired height, and a further object of the invention is to provide a compact mechanism whereby the severed tops may be delivered into a wagon or other receptacle. A further object of the invention is to provide a harvesting machine in which the working parts will be driven from one of the supporting wheels, and a still further object is to provide a strong and durable frame which will firmly support all the working parts. The invention also provides a novel supporting means for the frame and means for adjusting the frame vertically relative to the said supporting means. Other objects will appear incidentally in the course of the following description.

Figure 3:
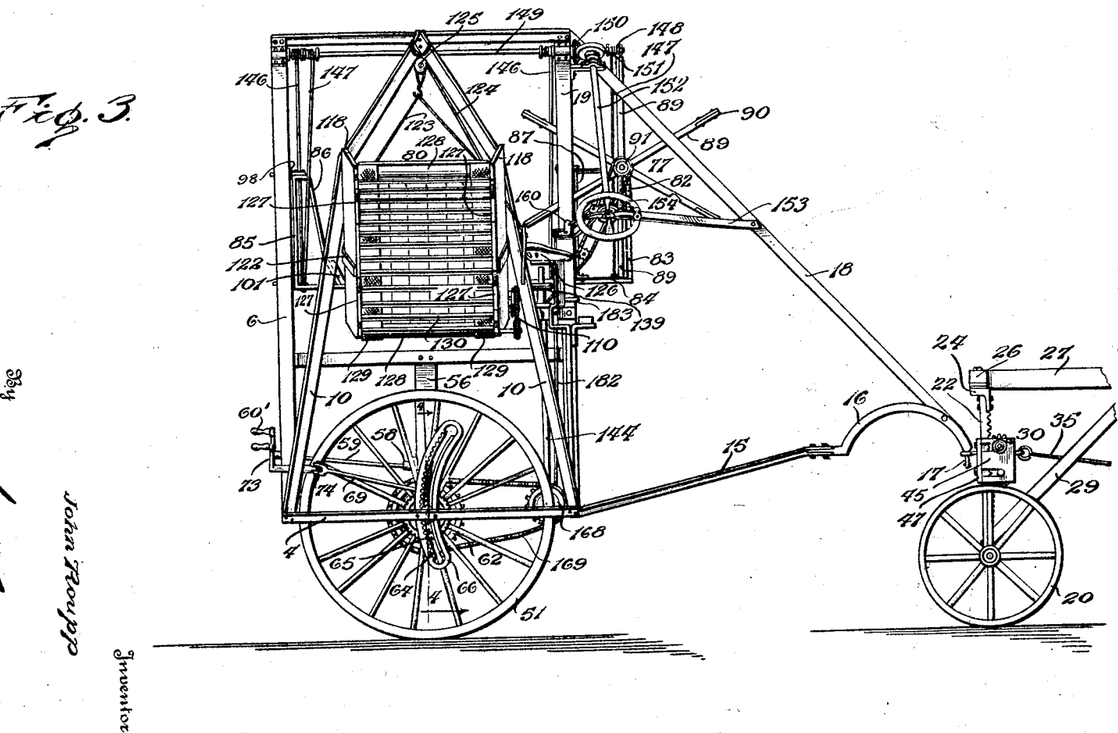
Fig. 3 is a side view thereof.

The main frame of my machine is constructed of angle bars and includes a rear bar 1 extending the full width of the machine. Longitudinal bars 2 and 3 are secured to and extend forward from the said bar 1 near one end thereof, and to the ends of said bar similar bars 4 are secured. The front ends of the bars 2, 3 and one bar 4 are connected by a bar corresponding to the rear bar 1 but terminating substantially at the middle of the frame. There is also a cross bar disposed substantially midway the front and rear of the machine so that the necessary strength and rigidity is attained and a firm support for the working parts is provided. The details of the arrangement may be varied more or less as may be desired and for that reason are not illustrated with preciseness in the accompanying drawings. At one end of the lower portion of the main frame, I erect posts 5, and similar posts 6 are erected at about the center line of the machine, the said posts being braced by guys 7 and having their upper ends connected by frame bars 8 as well as by guys 9. At the end of the frame more remote from the posts 5, I provide the posts 10 which converge upwardly, as shown most clearly in Fig. 3. A central cross bar 11 connects the upper ends of the posts or standards 10 with the inner longitudinal bar 12 connecting the upper ends of the posts 6. A bar 13, corresponding to the bar 12, is provided at the opposite side of the frame and extending between the said bars 12 and 13 in rear of the front ends thereof is a frame bar 14. Extending forwardly from the lower ends of the posts 10 and 6 are the forwardly and upwardly converging draft frame bars 15 which are secured together at their forward extremities, and to the said joined extremities I secure the rear end of an arch 16 which terminates at its front end in a depending straight pintle 17 which is of circular outline in horizontal section. A brace 18 extends from the upper end of the front post 6 to the forward portion of the arch 16 and has its ends rigidly secured to the said members, thereby rigidly connecting the arch to the upper portion of the main frame so that dropping of the arch is prevented and draft is applied to the upper portion of the main frame as well as to the lower portion thereof. A brace 19, similar to the brace 18, extends from the front end of the side bar 4 to the upper end of the front post 6 and is rigidly secured thereto so that additional rigidity is imparted to the structure.

The front truck is supported by wheels 20 which may be of any well-known or preferred form and are carried by spindles 21 which have their inner ends flattened and upturned to be rigidly secured to the lower extremities of vertically disposed rack bars 22. The said rack bars 22 are connected at their upper ends by a bridge piece or cross bar 24 whereby a rigid truck frame is produced. Upon the said cross bar 24 at the center of the same, I secure a socket or bracket 26 which receives the rear end of the tongue or pole 27 which is rigidly secured therein by a bolt 28 inserted vertically through the tongue and the cross bar, as will be readily understood. The rigidity of the truck is further increased by the provision of braces 29 which extend between the tongue and the lower ends of the rack bars and are rigidly secured thereto. Mounted for vertical movement upon the rack bars is a yoke or coupling head 30 which carries pinions two of which are seen at 31, meshing with the rack bars, and is constructed to slidably fit around the rack bars so as to be held to a rectilinear path and maintain the engagement of the pinions with the rack bars. A draft coupling plate is secured rigidly in the yoke or head 30 and its front end is engaged with the rear end of a draft rod 35 while its rear end provides a horizontally disposed eye 36 through which the pintle 17 loosely engages. A cotter pin or other retaining device may be provided at the lower end of the pintle 17 so that, while vertical movement of the coupling plate relative to the pintle is permitted, the separation of the parts will be prevented. The front end of the draft rod 35 is engaged with draft-applying devices whereby travel is imparted to the machine. The yoke or coupling head 30 comprises a horizontally disposed web having vertical webs as 42, integral with its rear and front edges, suitable cross webs, and end webs 45 which are constructed with open-ended slots or notches providing bearings for the hubs or axial members of the pinions which mesh with the rack bars 22. The rack bars 22 are held in mesh with the pinions by a back plate or cap plate 47. The yoke is thus mounted upon the rack bars 22 so as to be carried by the same and be movable vertically thereon, and the vertical movement of the yoke will, of course, carry with it the draft coupling plate and effect vertical adjustment of the arch 16. A bar 48 is provided to rotate the pinions and effect vertical adjustment of the yoke, and suitable ratchet mechanism will hold the yoke in a set position.

The main frame or rear portion of the machine is supported by a driving or bull wheel 51 at one side and by a ground wheel 52 at the opposite side. Mechanism is provided for transmitting the motion of the bull wheel to the working parts and mechanism is also provided to effect vertical adjustment of the frame relative to each of the wheels 51 and 52. The wheel 52 is rotatably mounted upon a stub axle 53 secured rigidly to or formed integral with a plate 54, which plate is provided with rack teeth 55 on its rear edge. The wheel is held upon the stub axle 53 by any preferred or known means, and the plate 54 is slidably fitted in a guiding bracket 56 which is secured vertically upon the adjacent end members of the main frame. The said guiding bracket 56 consists of a flat plate provided at its vertical edges with re-entrant flanges 57 presenting channels or grooves which slidably receive the edges of the plate 54. At a convenient point of the rear channel or flange 57 is provided or formed a boxing 58 in which is journaled the lower front end of a shaft 59 having a head 60 at its front end. The front face of the head 60 is formed or equipped with a volute rib or cam 61 which is adapted to engage with the rack teeth 55 and thereby maintain the plate 54 at any desired height. Rotation of the shaft 59 will, of course, effect rotation of the cam 61 relative to the rack teeth 55 and will thereby impart vertical movement to the plate 54 and adjust the main frame relative to the wheel 52. The shaft 59 is disposed obliquely upon the end of the main frame and is equipped at its rear end with a crank or other suitable handle 60'.

Figures 4, 6, 7:
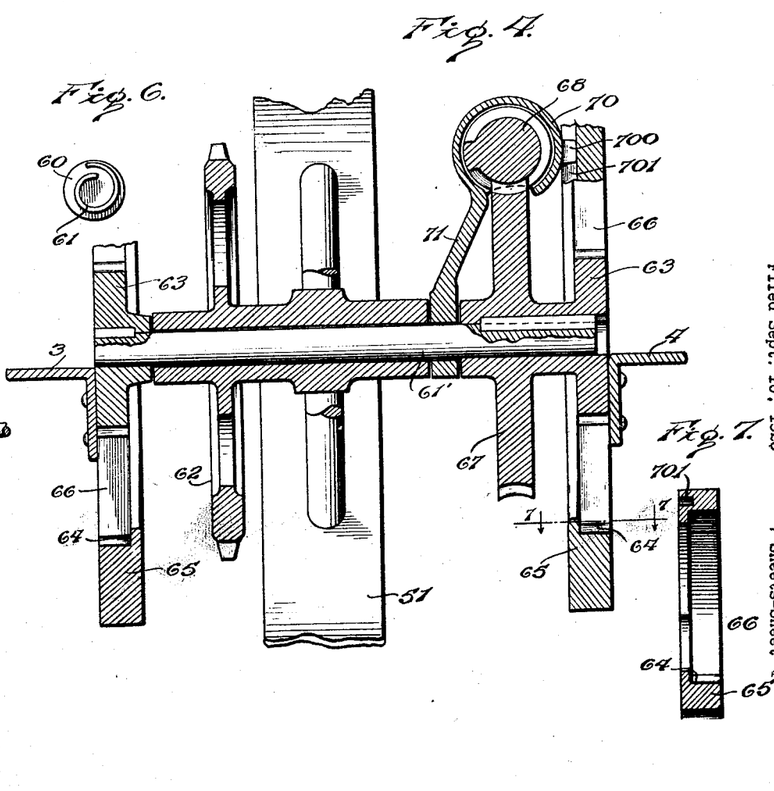
Fig. 4 is an enlarged section on the line 4—4 of Fig. 3.
Fig. 6 is a detail end view of the cam shown in Fig. 5.
Fig. 7 is a detail section on the line 7—7 of Fig. 4.
Figure 5:
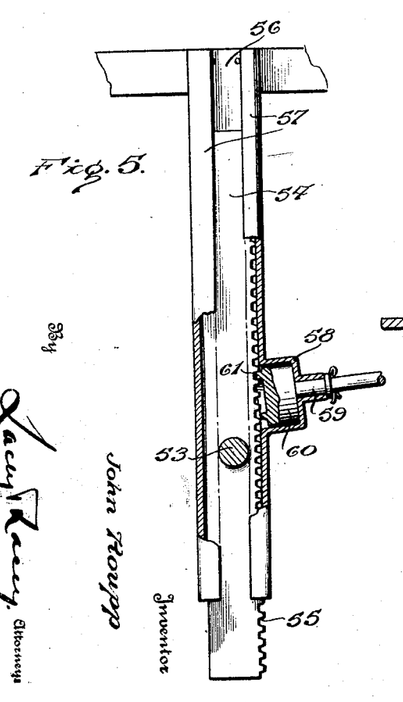
Fig. 5 is an enlarged section on the line 5—5 of Fig. 1.

The bull or driving wheel 51 is loosely mounted upon its axle 61', and rigidly secured to or formed integral with the inner side of the bull wheel is a main driving sprocket 62. The ends of the axle 61' have keyed or otherwise rigidly secured thereto pinions 63 which engage rack bars 64 which are formed on the rear sides 65 of slotted brackets 66 rigidly secured to the main frame. Adjacent the outer pinion 63, a worm gear 67 is keyed or otherwise secured to the axle 61', and this worm gear may conveniently be formed integral with the pinion 63, as shown clearly in Fig. 4. The worm gear 67 meshes with a worm 68 carried by the front end of an adjusting shaft 69 and mounted within a gear case 70 carried by the upper end of an arm 71 which is loosely engaged upon the axle 61', as shown in Fig. 4. The gear case 70 is substantially cylindrical in form having an open bottom or lower side and also having its forward end open but covered by a cap plate 72 which is to be secured to the front end of the housing or case after the parts have been assembled. The gear case may be engaged with the slotted bracket in any preferred manner to accommodate the relative movement of the parts and maintain its operative position. I have shown a lug 700 on the side of the case engaging a groove 701 in the side of the bracket. The rear end of the adjusting shaft 69 is equipped with a handle 73 journaled in a suitable bearing upon the adjacent end of the main frame and connected with the main portion of the shaft by a gimbal joint 74 whereby the forward portion of the shaft may follow the vertical movement of the worm gear as the axle 61' rides up or down within the slotted brackets 65. Any convenient means may be provided to prevent endwise releasing movement of the adjusting shaft 69, such as washers 75 and cotter pins 76.

The mechanism for cutting and removing the tops of the crop comprises a reel 77, a cutter 78, a platform 79 and an elevator 80, these parts being mounted upon the posts 5 and 6 and adjustable vertically simultaneously. The reel comprises a shaft 81 which may be tubular and is journaled at its ends in bearings, as 82, secured upon the upper front ends of upright members 83 forming parts of a frame whereby the reel and the platform are carried. This frame may conveniently be constructed of channel bars and includes the horizontal members 84 which extend rearwardly from the lower ends of the vertical members 83 and are suitably shaped to pass under and be secured to the frame of the platform. At their rear ends, these members 84 are secured to or formed integral with upright members 85 and from the upper ends of the said members 85 braces 86 extend downwardly and forwardly to be united with the rear portions of the respective horizontal members 84. Bracing members 87 impart rigidity to the front upright members 83. Between the ends and the center of the reel shaft 81, I secure thereto collars or hub members 88 to which are secured radial arms 89, and to the outer extremities of the said arms are secured blades or beater plates 90 which constitute the active working elements of the reel. As the machine is drawn forward over the field, the reel is rotated and the blades or plates 90 bend the heads of the plants rearwardly so that they will be held to the cutter and will be easily and effectually severed. The reel bearings 82 may be of approved design and are adjustable vertically upon the frame members 83 in order that the height of the reel relative to the cutter may be varied as circumstances may demand. Upon the inner end of the shaft 81 is secured a sprocket pinion 91, around which is trained a sprocket chain 92 which is also trained around a sprocket pinion 93 secured upon the inner end of a transmission shaft 94 which will be presently more particularly referred to. A chain tightener or idle sprocket 95 is carried by a bracket 96 secured upon the adjacent member 87 so as to maintain the chain 92 in a taut operative condition. Brackets 97 are secured to each member 84 and to upper ends of the frame members 85 and 87, and these brackets carry rollers 98 which run upon the webs or flanges of the adjacent posts 5 and 6, respectively, whereby to guide the reel-supporting frames, as the same are adjusted vertically, and also to prevent the platform tilting forwardly.

The platform consists primarily of a plurality of boards 99 disposed close together and secured upon the rear extensions of the members 84, the said boards 99 projecting outwardly beyond the posts 6 but terminating at or short of the posts 5. Brackets of any desired or convenient construction, as indicated at 100 in Fig. 1, may be provided at the ends of the platform and at intermediate points thereof to support the back rail 101 and to provide bearings for the rollers 102 at the ends of the platform. These rollers 102 support and impart motion to endless bands 103 which are disposed in parallelism at the front and rear edge, respectively, of the platform and are connected at intervals by cleats or pusher bars 104. One of the rollers 102 is provided with a shaft 105 projecting from its front end and upon the said shaft is secured a gear 106, the extremity of the shaft being supported in a bearing 107 upon the upper side of a casting or main supporting bracket 108 which is secured to and projects laterally from the adjacent frame member 84. The shaft 105 also carries a sprocket pinion 109, and a sprocket chain 110 is engaged with the said sprocket pinion and also with a sprocket pinion 111 which is provided upon the front end of the lower roller or drum of the elevator, as will be presently set forth. To maintain the taut condition of the chain 110, I provide a tightener or idle sprocket 112. This sprocket 112 is mounted loosely upon a pintle 113 projecting from a sleeve 114 which is slidably mounted upon a supporting arm 115 secured to and projecting from a corner of the main gear supporting bracket 108. The sprocket is retained upon the spindle 113 by any convenient means, and a contractile spring 116 is connected at one end with the outer end of the arm 115 and at its opposite end with the sleeve 114, the spring holding the sprocket constantly in mesh with the chain 110, as will be readily understood and as is clearly shown in Fig. 17.

Figure 1:
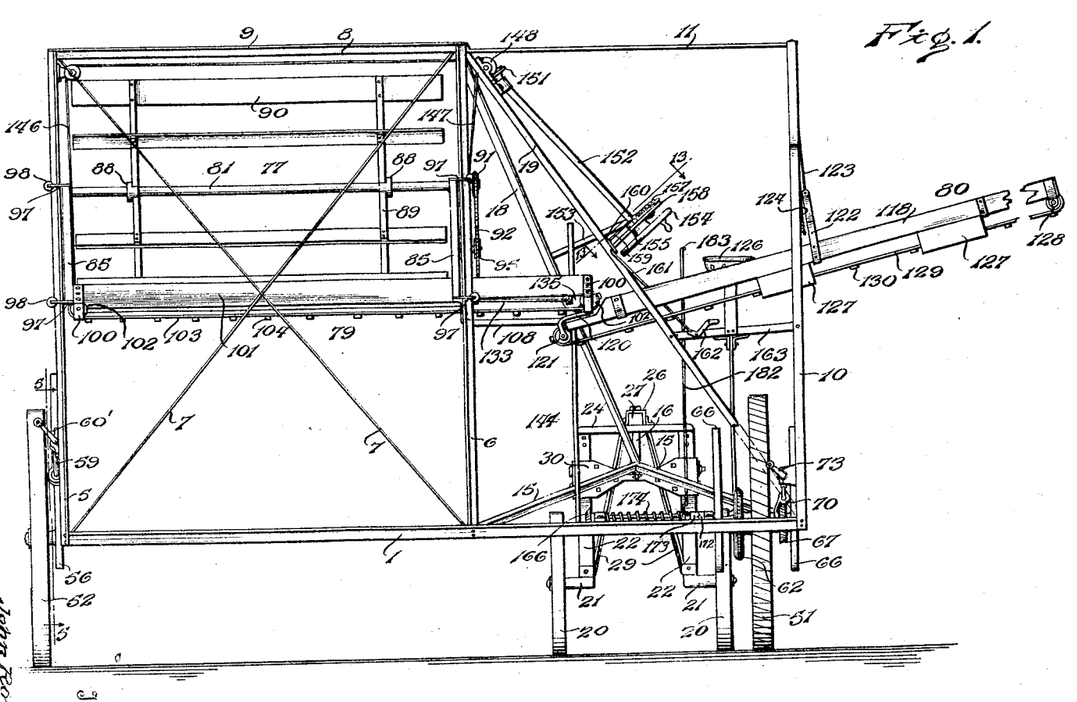
Figure 1 is a rear elevation of a harvester embodying my present improvements.
Figure 2:
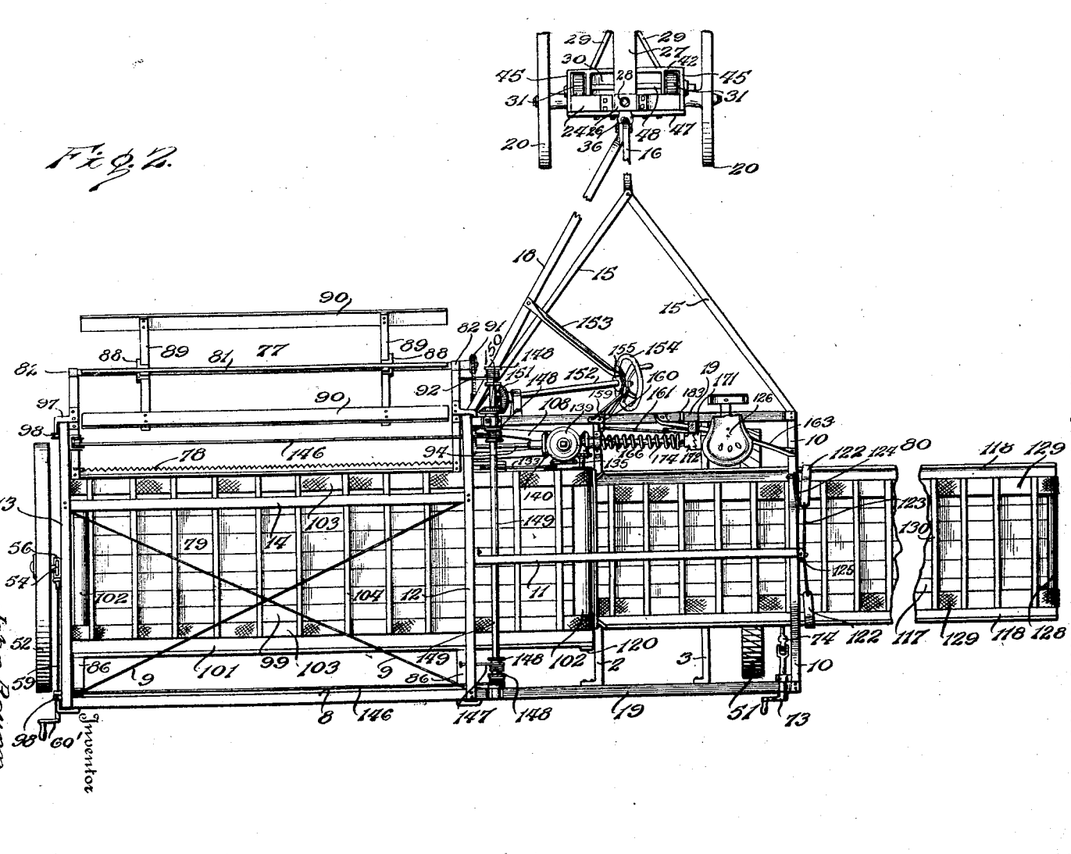
Fig. 2 is a plan view of the same.

The elevator consists primarily of longitudinally extending rails 117 and upwardly diverging side boards or wings 118, the said members being held rigidly together by cross bars 119 of proper form. The elevator is pivotally supported at its inner end from the adjacent end of the platform and the inner lower end of the elevator is disposed below and inwardly beyond the end of the platform, as shown clearly in Fig. 1. To support the elevator from the platform, I provide the brackets 120 which are each secured at one end to the adjacent brackets 100 of the platform and are also secured to the side members 118 of the elevator, the brackets 120 being extended beyond the end of the elevator to provide bearings for the roller or drum 121 at the inner lower end of the elevator. At about its center, I secure to the side rails 118 of the elevator the brackets or hangers 122 which project upwardly and inwardly and have secured to their upper ends a bail 123 which, in turn, is secured to a hoisting cable 124 which is trained over a pulley block 125, secured at the upper ends of the posts 10, and thence extended downwardly to a point adjacent the driver's seat 126 where it is secured by wrapping around a cleat or other holding element. The elevator can be easily adjusted to any desired inclination by an obvious manipulation of the cable 124 and the outer end of the elevator thus set at any desired height so as to clear a wagon or other receptacle. To protect the elevator against damage by contact with the wagon or with the bull wheel of the machine, bumper blocks 127 are secured to the lower edges of the side members 118, as shown in Fig. 1. A roller 128 is provided at the upper outer end of the elevator corresponding to the roller 121 at the inner end thereof and parallel endless belts or bands 129 are trained around the said rollers, the said belts or bands being connected at intervals by cleats or cross bars 130. It will be readily understood that the belts 103 and 129 ride upon the upper surfaces of the bottom boards of the platform and the elevator respectively so that the respective cleats or cross bars 104 and 130 will engage the material deposited upon the platform and will feed the same from the platform onto the elevator and then from the elevator over the end of the same into the wagon or other receptacle.

Figure 8:
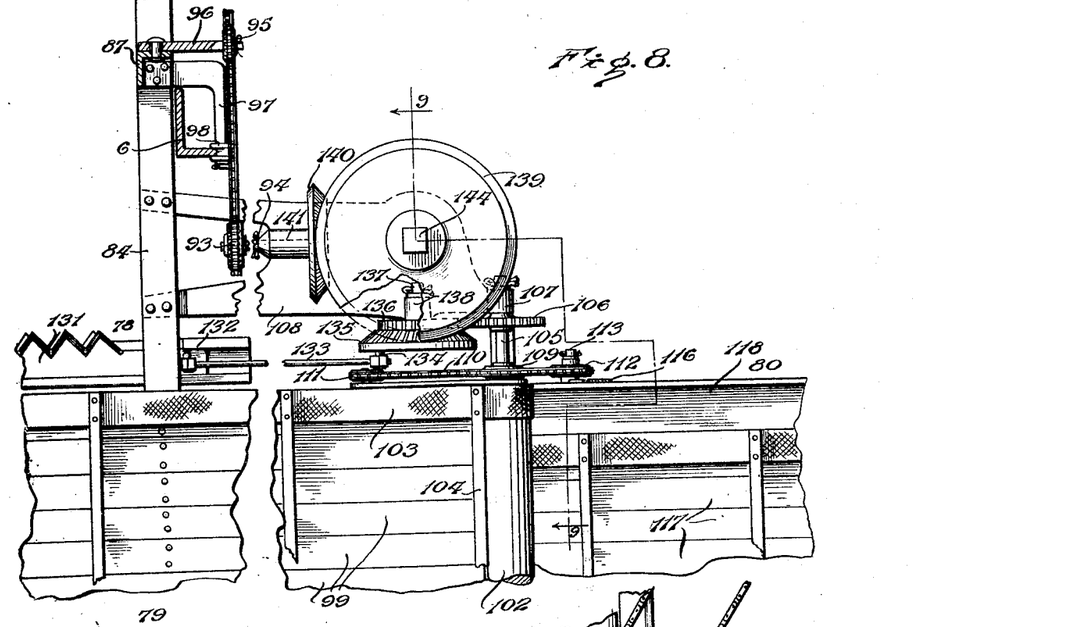
Fig. 8 is an enlarged plan view of a portion of the apparatus.
Figure 9:
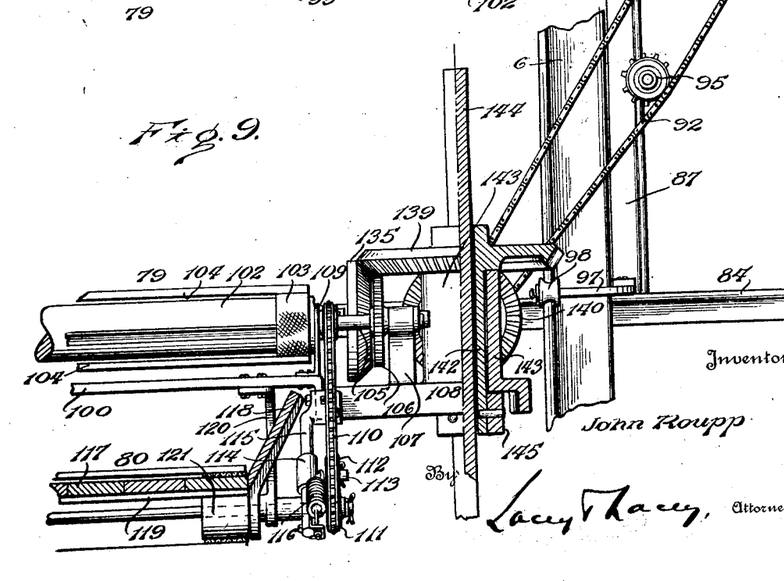
Fig. 9 is a view, partly in side elevation and partly in section, on the line 9—9 of Fig. 8.
Figures 10, 11, 12:
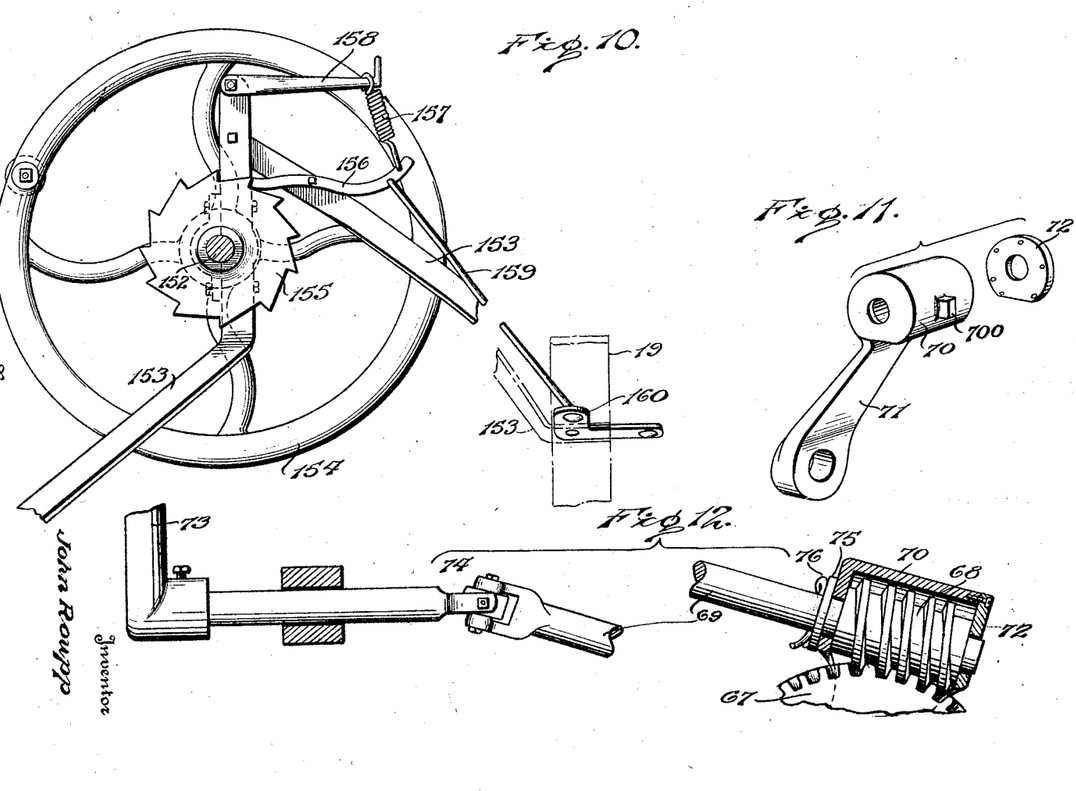
Fig. 10 is an enlarged section on the line 13—13 of Fig. 1.
Fig. 11 is a detail perspective view of a gear case employed as one element of the mechanism for adjusting the main frame vertically.
Fig. 12 is an enlarged view of a portion of said mechanism.
Figure 13:
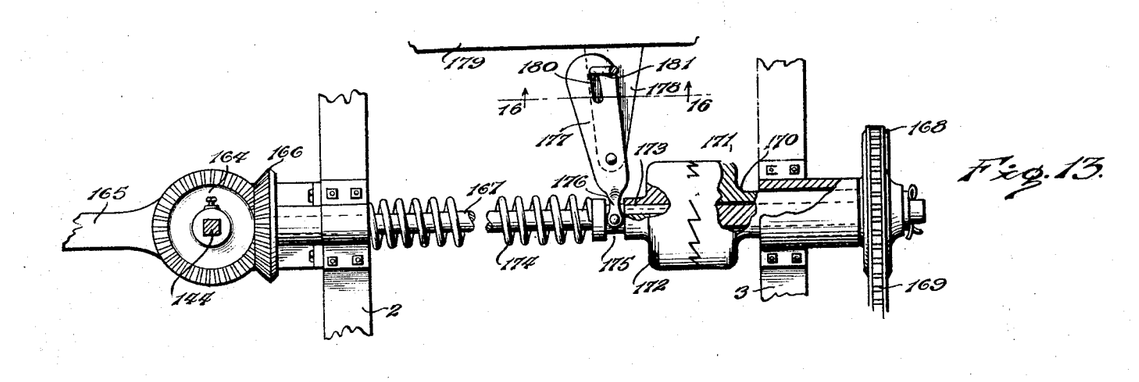
Fig. 13 is a view, partly in plan and partly in section, of the clutch mechanism for controlling the main operating mechanism.
Figure 14:
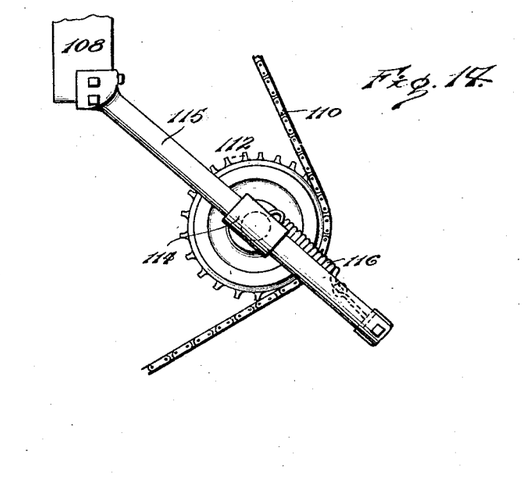
Fig. 14 is a detail view of a chain tightener.
Figure 15:
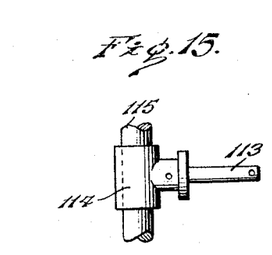
Fig. 15 is a view of the spindle upon which the chain tightener sprocket shown in Fig. 17 is mounted.
Figure 16:
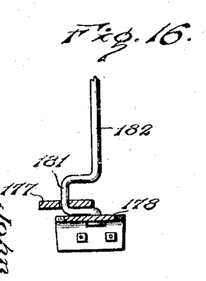
Fig. 16 is a detail section on the line 16—16 of Fig. 13.

The cutter consists of a blade 131 of any desired formation slidably mounted in a finger bar 132 which is supported by the members 84 and the brackets of the platform. This cutter 131 will preferably cooperate with guard fingers of the usual formation (not shown), and to one end of the cutter bar is connected the pitman 133 in the usual manner. The pitman 133 is engaged with a wrist pin 134 on the rear side of a gear 135, the said gear 135 being integral with a spur gear 136 meshing with the gear 106, as shown most clearly in Fig. 8. The double gear 135 and 136 is carried by an axle or spindle 137 journaled in a bearing 138 on the upper side of the main gear support 108 and the said gear 135 is directly driven by a master beveled gear 139. The master gear 139 also meshes with a beveled gear 140 on the outer end of the shaft 94, which shaft is journaled in a bearing 141 carried by the main casting 108. The gear 139 is constructed with an elongated hub 142 which is journaled in a hollow post 143 forming a part of the main bracket or gear casting 108 and the bore of the said hub is angular so that it may slidably receive the vertical driving shaft 144 but will be constrained to rotate with the said shaft. The gear 139 rests upon the upper end of the hollow post or sleeve 143, as shown clearly in Fig. 9, and a stop collar 145 is secured to the lower end of the hub 142 to engage against the lower end of the sleeve 143 so that the gear will be held against vertical movement. It will be readily noted that the single gear 139 actuates the gear 140 which imparts motion to the parts acting to rotate the reel and also actuates the double gear 135 and 136 whereby the cutter, the platform belt and the elevator belt are actuated.

The frame members 83, 84 and 85 which support the reel and the platform are suspended by cables 146 and 147 secured to the said frame members 84 and wound upon drums 148 secured upon a shaft 149 mounted in suitable bearings upon the posts 6 and 19 near the upper ends of the same. The front end of the shaft 149 is equipped with a beveled gear 150 meshing with a beveled gear 151 carried by and secured to the upper end of a regulating shaft 152 which is journaled in suitable bearings carried by the posts 6 and by a bracket and bracing member 153 secured to and extending between the brace bars 18 and 19. The lower end of the shaft 152 carries a hand wheel 154 so that, if the said hand wheel be rotated, the motion will be imparted through the shaft 152 and the gears 151 and 150 to the shaft 149 whereby the drums will be rotated to wind or unwind the cables 146 and 147. To hold the platform and the reel at the height to which they have been moved through the winding or unwinding of the cables, a ratchet 155 is secured upon the shaft 152 immediately above the hand wheel, and a holding pawl or dog 156 is mounted upon the bracing bracket member 153 in position to engage the said ratchet wheel and thereby prevent retrograde movement of the same and of the shaft. The inner end of this dog is normally held in engagement with the ratchet wheel by a spring 157 attached to the outer free end of the dog and to an arm 158 upon the bracket 153. To release the dog, a link 159 is attached thereto and extends therefrom to an angle lever 160 mounted upon the frame member 19, which angle lever is, in turn, connected by a link 161 with a treadle 162 mounted upon the frame bar 163 which carries the driver's seat. The treadle 162 may be easily pressed by the foot of the driver when it is desired to permit the reel and the platform with the cutter to be lowered, and it will be readily understood that this adjusting mechanism permits the cutter and the parts adjacent and cooperating therewith to be so set as to harvest crops varying greatly in height.

The lower end of the shaft 144 is secured in the hub of a gear 164 which is suitably journaled in and supported by a horizontal frame member 165 secured at one end to the main frame bar 2 and supported adjacent the front side of the main frame. This gear 164 meshes with a beveled gear 166 carried by the inner end of the main transmission shaft 167 which is journaled in suitable bearings upon the frame members 2 and 3 and at its outer end carries the sprocket wheel 168 which is operatively connected with the main driving sprocket 62 by a sprocket chain 169, as will be readily understood. The sprocket wheel 168 is loose upon the shaft 167 and its inner side is connected through an elongated hub member 170 with a clutch member 171. A mating clutch member 172 is slidably mounted upon the shaft but is keyed thereto, as shown at 173, so that it will be constrained to rotate therewith. The clutch member 172 is held normally in engagement with the clutch member 171 by a spring 174 coiled around the shaft between the frame member 2 and the end of the hub of the member 172. The hub of the clutch member 172 is constructed with an external annular groove 175 which is engaged by the fork 176 at the rear end of a lever 177 fulcrumed upon a bracket 178 secured to and extending rearwardly from the front member 179 of the main frame. The lever 177 is provided with a longitudinal slot 180 in its forward portion, and this slot receives the crank member 181 of a rock shaft 182 disposed vertically at the front of the frame and journaled at its lower end in the bracket 178. The upper end of the shaft 182 is provided with a crank handle 183 which is disposed adjacent the driver's seat and the upper portion of the shaft 182 may be journaled in a suitable bearing upon the bar 163 which supports the seat and extends between the members 10 and 19. If the shaft 182 be turned through one-fourth of a circle, the crank 81 thereof will act upon the walls of the slot 180 so as to turn the lever 177 about its pivot and thereby shift the clutch member 172 into or out of engagement with the clutch member 171 so that the machine may continue to travel over the field without regard to whether the working elements are at rest or in motion.

From the foregoing description, taken in connection with the accompanying drawings, it will be seen that I have provided a very compact machine which may be readily drawn over a field and which, as it moves forward, will cut the tops of the plants and deliver them to a wagon or other receptacle drawn over the field alongside the machine. The cutting mechanism may be easily adjusted to the desired height and the platform and elevator will be simultaneously shifted so as to cooperate properly with the cutter. Vertical adjustment of the frame relative to the wheels and the front truck will permit the clearance of boulders and also enable the frame to pass readily over the stubble which will be left by the cutter so that clogging of the working parts will be avoided. The machine may, of course, be built in any size desired but is intended ordinarily to be of such proportions that it may cut two rows of plants simultaneously.

Having thus described the invention, what is claimed as new is:

1. In a harvester, the combination of a portable main frame including upright members, longitudinally extending frames mounted upon the said upright members for vertical sliding movement and disposed between said upright members, drums mounted longitudinally upon the upright members of the main frame at the top thereof, cables secured to the slidably mounted frames and trained about said drums, means upon the main frame for operating said drums, a reel mounted upon said slidably mounted frames at the front of the main frame, a platform carried by said slidably mounted frames in rear of the reel, a cutter mounted at the front side of the platform, and means upon the main frame for operating the reel and the cutter.

2. In a harvester, the combination of a portable main frame including upright members, frames mounted for sliding movement upon the said upright members, drums mounted upon the main frame, cables secured to the said slidably mounted frames and trained about said drums, a regulating shaft mounted upon the main frame and geared to the said drums, a hand wheel secured to the lower end of said regulating shaft, means cooperating with the said shaft to lock the same against rotation, a reel mounted upon the slidably mounted frames, a platform carried by said frames in rear of the reel, a cutter at the front side of the platform, and means for operating the reel and the cutter.

3. In a harvester, the combination of a portable main frame including upright members, frames slidably mounted upon the said upright members, a reel carried by said slidably mounted frames, a platform carried by said slidably mounted frames in rear of the reel, a cutter on the front side of the platform, means on the main frame for operating the reel and the cutter, drums mounted upon the main frame, cables secured to the slidably mounted frames and wound upon said drums, means for operating the drums including a regulating shaft extending downwardly and outwardly therefrom and mounted upon the main frame, a hand wheel on the lower end of the said shaft, a ratchet concentric with the shaft and secured thereto, a dog normally engaging the said ratchet, an angle lever mounted upon the main frame, a connection between one arm of said lever and the dog, a treadle mounted upon the main frame below the hand wheel, and a connection between the said treadle and the angle lever.

4. In a harvester, the combination of a portable main frame including spaced upright members, spaced frames disposed longitudinally of the main frame and mounted for sliding movement upon the said upright members, said frames comprising horizontally disposed members arranged between and adjacent the upright members of the main frame, and uprights at the front and rear ends of said horizontal members, cables attached to the upper ends of said last-mentioned upright members, means upon the main frame cooperating with said cables to adjust the slidably mounted frames vertically, a reel mounted on and between the front upright members of said slidably mounted frames, a platform secured upon the horizontal members of said slidably mounted frames in rear of the reel, a cutter on the front side of the platform, and means on the main frame for operating the cutter and the reel.

5. In a harvester, the combination of a portable main frame, carrying frames mounted upon the main frame for vertical sliding movement, a reel carried by said vertically slidable frames, a platform secured upon said carrying frames, a conveyer movable over the platform, a roller mounted upon the platform to drive said conveyer and having its axle extending forwardly from the platform, a cutter mounted upon the front side of the platform, a bracket secured to and extending laterally from the vertically slidable carrying frames adjacent the said roller, a shaft mounted upon the said bracket and having its inner end operatively connected with the reel, a beveled gear upon the outer end of said shaft, a spur gear upon the extended axle of the said roller, a bearing for said axle upon said bracket, a spur gear meshing with the first-mentioned spur gear, a beveled gear fixed to the last-mentioned spur gear concentric therewith, a pitman connecting the said beveled gear with the cutter, a master gear meshing with both said beveled gears, said master gear being mounted upon the said bracket and held against vertical movement relative thereto, and means upon the main frame for actuating said master gear, said means including an angular shaft rising slidably through the said master gear.

6. In a harvester, the combination of a portable main frame, carrying frames mounted upon the main frame for vertical sliding movement, a reel carried by said vertically slidable frames, a platform secured upon said carrying frames, a conveyer movable over the said platform, a cutter mounted at the front of the platform, a bracket carried by one of the vertically slidable carrying frames, an elevator mounted upon the main frame in alinement with the platform, rollers at the ends of the elevator and the platform, the roller at the end of the platform actuating the conveyer which moves over the same, gearing mounted upon the said bracket for actuating the last-mentioned roller, the cutter and the reel, means upon the main frame for driving said gearing, a sprocket fixed to the roller at the end of the platform, a sprocket fixed to the roller at the lower end of the elevator, a chain trained around the last-mentioned sprocket and engaged with the first-mentioned sprocket, an arm projecting from the said bracket, an idler sprocket slidably carried by said arm and adapted to engage the said chain, and yieldable means connected with said arm for holding the idler sprocket in mesh with the chain.

7. In a harvester, the combination of a portable main frame, carrying frames mounted upon the main frame for vertical sliding movement, a reel carried by said vertically slidable frames, a platform secured upon said vertically slidable frames in rear of the reel, a cutter at the front side of the platform, a conveyer movable over the platform, gearing carried by one of said vertically slidable frames for actuating the reel, the cutter and said conveyer, a shaft mounted upon the main frame and rotated by the travel of the frame, a vertically disposed shaft actuated by said last-mentioned shaft and adapted to actuate the first-mentioned gearing while permitting vertical movement of the same, a clutch controlling the rotation of the shaft upon the main frame, a lever mounted upon the main frame and operatively connected with said clutch, said lever being pivoted between its ends and provided with a longitudinally extending slot adjacent its free end, and a vertically disposed rock shaft having its lower end journaled below the said lever and provided with a crank playing in the longitudinal slot in the lever.

8. In a harvester, the combination of a wheel-supporting main frame, cutting and conveying elements mounted upon the frame, means carried by the frame for actuating said cutting and conveying elements, forwardly converging draft members extending from the bottom of the main frame, a draft member extending downwardly and forwardly from the top of the frame and secured at its lower end to the first-mentioned draft members, a pintle depending from the front ends of the draft members, a front truck, and a coupling carried by the truck and vertically adjustable thereon and pivotally and slidably engaged with said pintle.

In testimony whereof I affix my signature.

JOHN ROUPP. [L. S.]